United States Patent [19]

Ivan

[11] 4,141,580
[45] Feb. 27, 1979

[54] COLLAPSIBLE WIND DEFLECTOR

[76] Inventor: Joseph R. Ivan, 9 Garrick Rd., Scarborough, Ontario, Canada, 1M1 1S6

[21] Appl. No.: 813,620

[22] Filed: Jul. 7, 1977

[51] Int. Cl.² .............................................. B62D 35/00
[52] U.S. Cl. ......................................................... 296/1 S
[58] Field of Search ........................ 296/1 S, 91, 95 R

[56] References Cited
U.S. PATENT DOCUMENTS

| 3,794,372 | 2/1974 | Webb | 296/1 S |
| 3,904,236 | 9/1975 | Johnson et al. | 296/1 S |
| 4,026,595 | 5/1977 | Jacks | 296/1 S |

Primary Examiner—Richard A. Bertsch
Attorney, Agent, or Firm—Robert F. Delbridge

[57] ABSTRACT

A collapsible wind deflector for mounting on a motor vehicle to deflect air around a trailer or the like towed by the motor vehicle including a substantially flat frame, means for mounting the frame upon an outer surface of the motor vehicle, a front panel hingedly affixed to the front of the frame, and a pair of side panels hingedly affixed to the front panel. The wind deflector may be folded flat for storage when not in use.

5 Claims, 4 Drawing Figures

COLLAPSIBLE WIND DEFLECTOR

BACKGROUND OF THE INVENTION

1. Field of the Invention

The present invention relates to air deflectors for use in conjunction with motor vehicles, and more particularly, to a collapsible wind deflector which may be stored substantially flat when not in use.

2. Description of the Prior Art

Characteristically, substantial aerodynamic drag is experienced by a trailer when pulled by a car or truck tractor. This leads to instability in high wind situations and loss of gas mileage. In order to reduce aerodynamic drag upon trailers, several devices have been proposed for mounting upon the roof of the motor vehicle pulling the trailer. These apparatuses divert the air rushing toward the trailer from directly hitting the same and consequently improve the gas mileage and handling characteristics. A major disadvantage of several presently known wind deflecting apparatuses is that they are bulky and cannot be conveniently stored when not in use. Presently known air deflector devices which may be collapsed for storage suffer from significant instability.

Typical of presently known non-collapsible air deflectors is the apparatus disclosed in U.S. Pat. No. 3,934,923 issued to Lissaman et al. on Jan. 27, 1976.

U.S. Pat. No. 3,419,897 issued G. N. Bratsberg on Dec. 31, 1968 discloses an air stream deflector for vehicles also of the non-collapsible variety.

U.S. Pat. No. 2,823,072 issued to E. G. Podolan on Feb. 11, 1958 discloses an air deflector for motor vehicles which includes an air foil which may be from position adjacent to the outer surface of a motor vehicle to a plane substantially transverse thereto. The air foil is supported by a single cantilever and may be subjected to twisting and buckling when in use.

The present invention overcomes the problems associated with the prior art by providing a wind deflector which is extremely stable when erected and which may be collapsed to a substantially flat position for storage.

SUMMARY OF THE INVENTION

Therefore, a primary object of the present invention is to provide a wind deflector for use in conjunction with motor vehicles which may be collapsed to a substantially flat position for storage.

A further object of the present invention is to provide a collapsible wind deflector which, when erected, is extremely sturdy.

A still further object of the present invention is to provide a collapsible wind deflector which may be easily and quickly mounted and dismounted from the roof of an automobile.

Still another object of the present invention is to provide a collapsible wind deflector which is ideally suited for inexpensive manufacture utilizing lightweight materials such as aluminum and fiberglass.

Another object of the present invention is to provide a collapsible wind deflector which is simple in design and durable.

These objects, as well as further objects and advantages, of the present invention will become readily apparent after reading the description of a non-limiting illustrative embodiment and the accompanying drawing.

A collapsible wind deflector according to the principles of the present invention includes a substantially flat frame; means for mounting the frame upon an outer surface of a motor vehicle; a substantially flat front panel hingedly affixed on a first edge thereof to the frame, the front panel having second and third opposed edges adjacent to the first edge thereof; a pair of side panels, a first edge of one of the side panels hingedly affixed to the second edge of the front panel, a first edge of the other of the side panels hingedly affixed to the third edge of the front panel, a second edge of each of the side panels for contacting the frame to erect the deflector when the front panel is pivoted away from the frame in a first plane substantially transverse thereto, the side panels each being disposed in a different plane substantially transverse to the first plane and substantially perpendicular to the frame, the side panels being pivotable to a position flush with the front panel, the side panels and the front panel being jointly pivotable adjacent to the frame for flat storage.

BRIEF DESCRIPTION OF THE DRAWING

In order that the present invention may be more fully understood it will now be described, by way of example, with reference to the accompanying drawing in which.

DESCRIPTION OF THE PREFERRED EMBODIMENT

Figure 1:
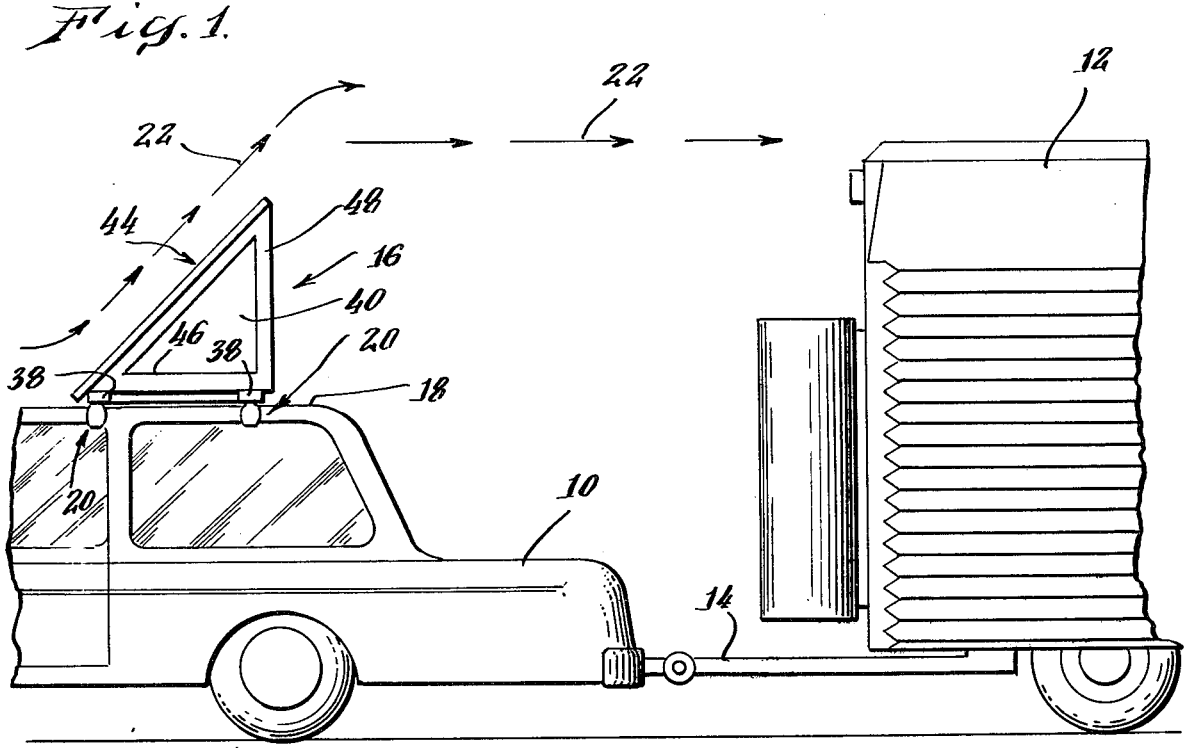
FIG. 1 is a pictorial representation of the preferred embodiment of the present invention mounted on a motor vehicle.

Referring now to the figures, and more particularly, to FIG. 1 thereof, there is illustrated therein a motor vehicle 10 pulling a trailer 12 by a trailer hitch 14. As is typical of such a situation, the trailer 12 is substantially greater in height than the motor vehicle 10. It is understood that reference to motor vehicle 10 is construed to include a truck tractor or the like. A collapsible wind deflector 16 is secured to the uppermost surface 18 of the motor vehicle 10 by a plurality of brackets 20 affixed to the rain gutters thereof. A plurality of arrows 22 are illustrated to depict the flow of air over the collapsible wind deflector 16 and past the trailer 12.

Figure 2:
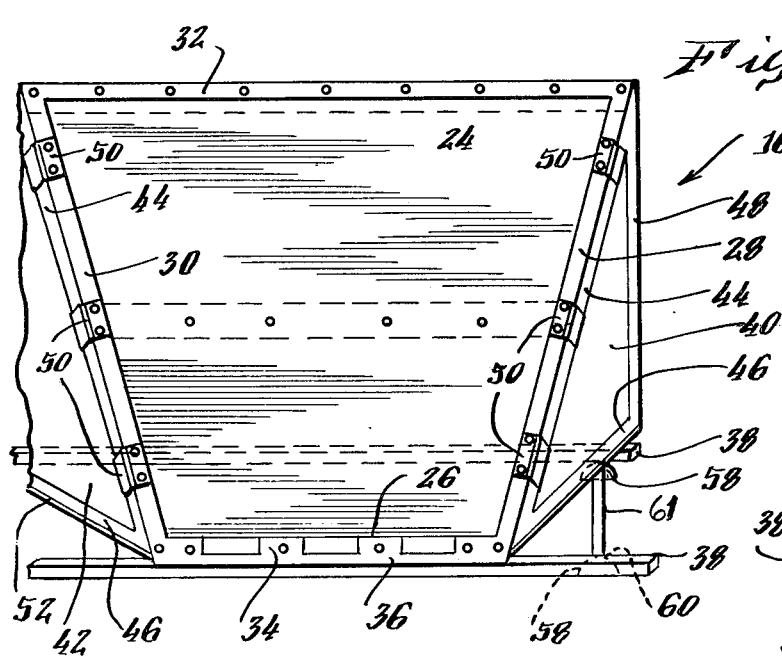
FIG. 2 is a front view in perspective of the preferred embodiment.

FIG. 2 illustrates a front view of the collapsible wind deflector 16. The collapsible wind deflector 16 includes a front panel 24 having a first edge 26, a second edge 28, a third edge 30, and a fourth edge 32 and is preferably substantially in the shape of an isosceles trapezoid. The wind deflector also includes a pair of side panels 40 and 42 each having a first edge 44, a second edge 46 and a third edge 48.

The first, second, third, and fourth edges 26, 28, 30, and 32 of the front panel 24 and the first, second, and third edges 44, 46, and 48 of the pair of side panels 40 and 42 are each covered by a substantially "U" shaped channel 54. The substantially "U" shaped channels 54 add stability and durability to the front and side panels 24, 40, and 42. The front panel 24 has a brace 56 fixedly secured thereto. The brace 56 extends between the second and third edges 28 and 30 of the front panel 24 and add additional rigidity thereto. The front panel 24 and the side panels 40 and 42 are preferably constructed of fiberglass or a similar light-weight material. The plurality of "U" shaped channels 54, the piano hinge 34, and the hinges 50 are each preferably constructed of aluminum or a similar lightweight material.

The first edge 26 of the front panel 24 is hingedly affixed by a piano hinge 34 to the front edge 36 of a substantially flat frame 38. The flat frame 38 includes side braces 39 and may be mounted to the uppermost surface 18 of the motor vehicle 10 by a plurality of brackets 20 as illustrated in FIG. 1 or by other suitable means. The pair of side panels 40 and 42 are each hingedly affixed on their first edge 44 thereof, respectively, to the second and third edges 28 and 30 of the front panel 24. The second edges 46 of the side panels 40 and 42 contact the frame 38 when the collapsible wind deflector 16 is erected as illustrated. The third edges 48 of each of the side panels 40 and 42 are each preferably configured in the shape of a right triangle as illustrated. The side panels 40 and 42 are hingedly affixed to the front panel 24 by a plurality of hinges 50. The hinges 50 are each limited travel butterfly hinges having the halves thereof limited to pivoting into planes transverse to each other. As a result, the second edges 46 of each of the side panels 40 and 42 are limited in travel to coincide with the sides 52 of the flat frame 38. A suitable fastener may be provided to fasten the side panels 40 and 42 to the rearmost portion of the frame 38. The substantially flat frame 38 may be constructed of aluminum or the like.

Figure 3:
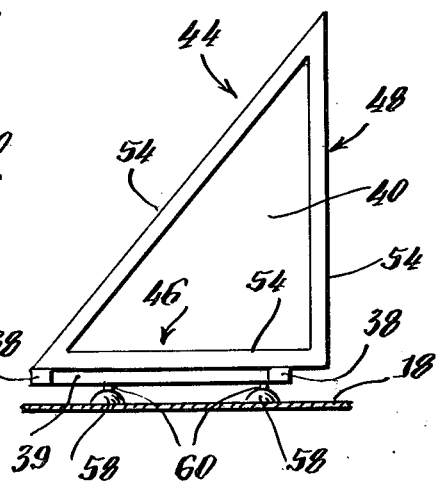
FIG. 3 is a side view in elevation of the preferred embodiment.

FIG. 3 is a side view of the collapsible wind deflector 16 illustrating alternate means for mounting the same upon the uppermost surface 18 of the motor vehicle 10. A plurality of suction cups 58 are each fixedly secured to the frame 38 by a plurality of brackets 60. The suction cups 58 engage the uppermost surface 18 of the motor vehicle 10 and retain the collapsible wind deflector 16 thereon.

Figure 4:
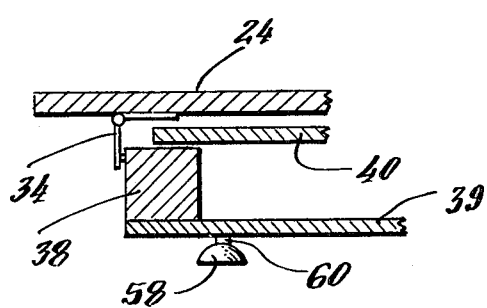
FIG. 4 is a fragmentary cross-sectional view of the present invention in a folded storage position.

FIG. 4 illustrates a fragmentary cross-sectional view of the collapsible wind deflector 16 in a folded position. The side panels 40 and 42, 42 not illustrated, are each pivoted about the hinges 50 to a position flush with the underside of the front panel 24. The front panel 24 and the side panels 40 and 42 are then pivoted adjacent to the frame 38. The front panel 24 is then selectively attached to the rearmost portion of the frame 38 by a suitable fastener to hold the deflector 10 firmly in a folded position. As a result, the collapsible wind deflector 16 is in a substantially flat position ideally suited for storage.

Therefore, a primary advantage of the present invention is to provide a wind deflector for use in conjunction with motor vehicles which may be collapsed to a substantially flat position for storage on or off the vehicle.

A further advantage of the present invention is to provide a collapsible wind deflector which, when erected, is extremely sturdy.

A still further advantage of the present invention is to provide a collapsible wind deflector which may be easily and quickly mounted and dismounted from the roof of an automobile.

Still another advantage of the present invention is to provide a collapsible wind deflector which is ideally suited for inexpensive manufacture utilizing lightweight materials such as aluminum and fiberglass.

Another advantage of the present invention is to provide a collapsible wind deflector which is simple in design and durable.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. A collapsible wind deflector adapted to be mounted on a motor vehicle comprising:
   a substantially flat frame;
   means for mounting said frame upon an outer surface of a motor vehicle;
   a substantially flat front panel of isosceles trapezoid shape hingedly affixed on a first edge thereof to said frame, said front panel having diverging second and third opposed edges adjacent said first edge; and
   a pair of side panels, a first edge of one of said panels hingedly affixed to said second edge of said front panel, a first edge of the other of said side panels hingedly affixed to said third edge of said front panel, a second edge of each of said side panels for contacting said frame to erect said deflector when said front panel is pivoted away from said frame in a first plane substantially transverse thereto, said side panels each being disposed in a different plane substantially transverse to said first plane and substantially perpendicular to said frame, said side panels being pivotable to a position flush with said front panel, said side panels and said front panel being jointly pivotable adjacent to said frame for flat storage.

2. A collapsible wind deflector in accordance with claim 1, wherein said side panels are each shaped in the form of a right triangle.

3. A collapsible wind deflector in accordance with claim 1 further, comprising a brace fixedly secured to said front panel, said brace extending between said second and third edges of said front panel.

4. A collapsible wind deflector in accordance with claim 1, further comprising a plurality of substantially "U" shaped channels, said channels disposed about and fixedly secured to said edges of said front and side panels.

5. A collapsible wind deflector in accordance with claim 1, wherein said side panels are hingedly affixed to said front panel by a plurality of butterfly hinges each having the halves thereof limited to pivoting into planes transverse to each other.

* * * * *